United States Patent [19]

Pehrson

[11] Patent Number: 5,375,777
[45] Date of Patent: Dec. 27, 1994

[54] PROCESS FOR MAKING A BUILDING MATERIAL

[76] Inventor: Donald A. Pehrson, 8297 Lewiston Rd., Batavia, N.Y. 14020

[21] Appl. No.: 32,794

[22] Filed: Mar. 17, 1993

[51] Int. Cl.⁵ ............................................. B02C 19/00
[52] U.S. Cl. ................................. 241/22; 241/DIG. 38
[58] Field of Search ............... 241/15, 21, 22, 101.8, 241/DIG. 38; 366/141

[56] References Cited

U.S. PATENT DOCUMENTS

| | | | |
|---|---|---|---|
| 4,034,847 | 7/1977 | Takagi et al. | 366/141 |
| 4,123,587 | 10/1978 | Wesch et al. | 241/22 |
| 4,600,547 | 7/1986 | Beckwith | 241/101.8 |
| 4,881,819 | 11/1989 | Blees | 366/141 |
| 4,919,722 | 4/1990 | Vazquez | 241/DIG. 38 |
| 5,110,521 | 5/1992 | Moller | 366/141 |
| 5,169,588 | 12/1992 | Estepp | 241/DIG. 38 |
| 5,178,455 | 1/1993 | Ohsaki et al. | 241/101.8 |
| 5,183,213 | 2/1993 | Knez | 241/DIG. 38 |
| 5,197,678 | 3/1993 | Trezek et al. | 241/DIG. 38 |

Primary Examiner—Timothy V. Eley
Attorney, Agent, or Firm—Howard J. Greenwald

[57] ABSTRACT

A process for preparing a building material from waste material. The waste material is ground and then mixed with an epoxy resin. The mixture of the ground waste material and the epoxy resin is then mixed with a silica material.

20 Claims, 1 Drawing Sheet

PROCESS FOR MAKING A BUILDING MATERIAL

FIELD OF THE INVENTION

A process for making a building material with improved acid and water resistance from waste material.

BACKGROUND OF THE INVENTION

Large volumes of solid waste material are generated every day. In today's society, which is sometimes referred to as "our disposable society," we are responsible for disposing of more waste per capita per year that at any previous time in history.

As is disclosed in U.S. Pat. No. 4,834,300, the present methods of dealing with refuse are landfills, recycling, and reclamation. Our present ability to reclaim and recycle waste products is presently responsible for only a small percentage of the total waste produced, the majority of which is thrown away, picked up by garbage trucks, and then taken to a landfill where it is buried permanently. In some cases, the waste material is incinerated.

These waste disposal methods are less than ideal, often causing a substantial amount of pollution and environmental damage.

It is an object of this invention to provide a process for preparing a building material from one or more waste products.

It is another object of this invention to provide building material which has acid resistance which is substantially superior to concrete.

It is yet another object of this invention to provide building material which has water resistance which is substantially superior to concrete.

It is yet another object of this invention to provide building material which is substantially less brittle than concrete.

SUMMARY OF THE INVENTION

In accordance with this invention, there is provided a process for preparing a building material. In the first step of this process, a waste product is ground so that substantially all of its particles are a thickness of less than about 0.5 inches. In the second step of the process, a resin precursor material and a hardener are mixed to form an epoxy mortar. In the third step of the process, the ground up waste material is mixed with the epoxy mortar. In the fourth step of the process, sand is mixed with the epoxy mortar/waste mixture. In the fifth step of the process entrained air is removed from the mixture.

BRIEF DESCRIPTION OF THE DRAWINGS

The present invention will be more fully understood by reference to the following detailed description thereof, when read in conjunction with the attached drawings, wherein like reference numerals refer to like elements, and wherein.

DESCRIPTION OF THE PREFERRED EMBODIMENTS

Figure 1:
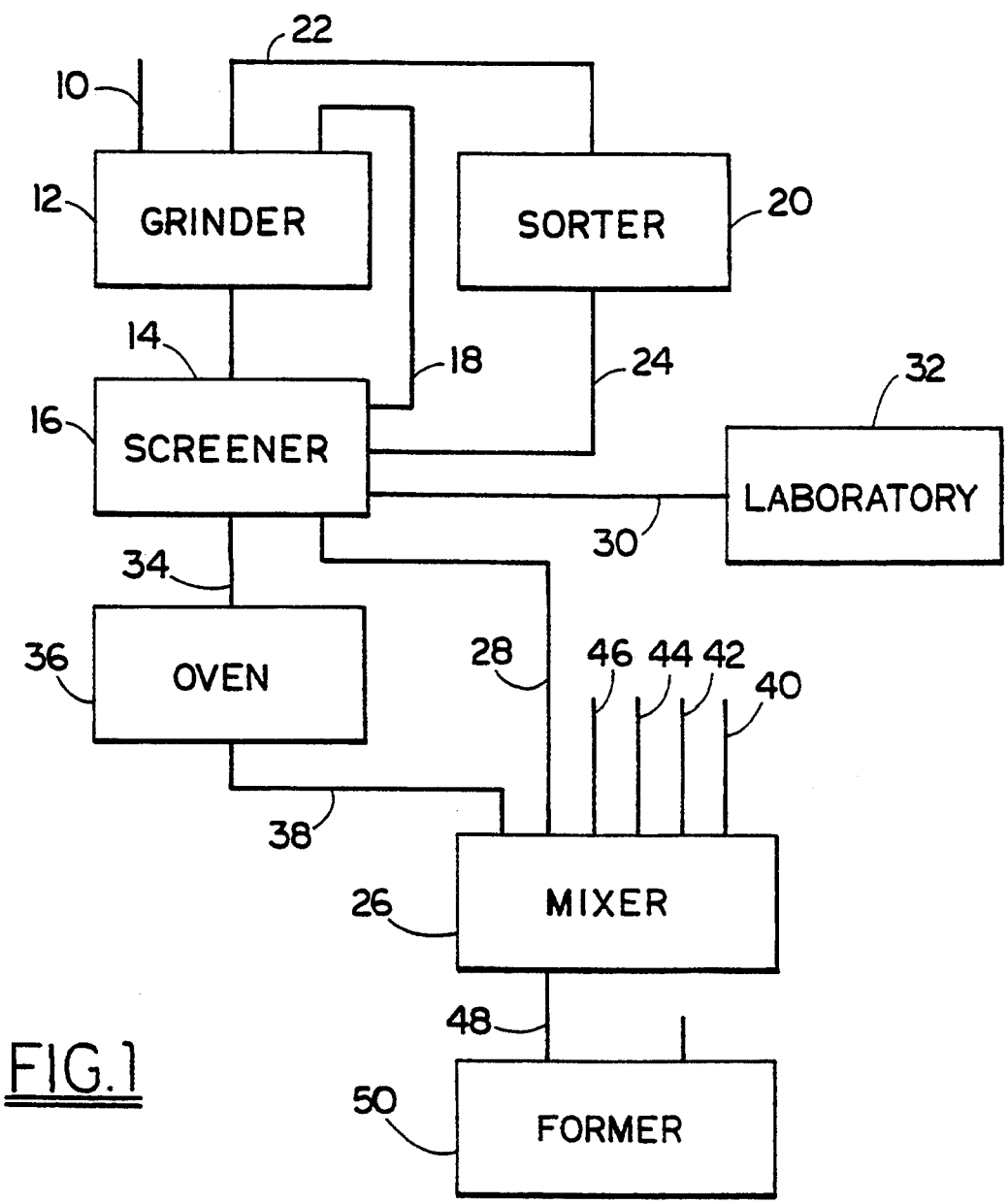
FIG. 1 is a flow diagram illustrating one preferred embodiment of applicant's process.

FIG. 1 illustrates one preferred embodiment of applicant's process. Referring to FIG. 1, it will be seen that waste material is charged via line 10 to grinder 12.

Substantially any waste material may be used in applicant's process.

Thus, by way of illustration, one may use municipal refuse material. This material is described, e.g., in U.S. Pat. Nos. 4,971,616 and 5,082,486. The entire disclosure of each of these patents is hereby incorporated by reference into this specification.

As is known to those skilled in the art, the municipal refuse will usually comprise from about 59 to about 73 percent, by total weight of refuse, of light organic material such as, e.g., paper, plastics, textiles, and low density material. The refuse also will usually be comprised of from about 3 to about 8 weight percent of heavy combustible organic material such as, e.g., corrugated paper, heavy plastics textiles, wood, leather, rubber, and other organic material. In addition, the refuse often will also contain from about 7 to about 12 weight percent of light waste such as, e.g., small particles of food waste, animal waste and litter, and lawn waste and garden waste.

In another embodiment, the waste material may be comprised of, or may consist essentially of, shredded rubber tires. In this embodiment, it is preferred to produce the shredded tire material by a shredding apparatus such as, e.g., that shown in U.S. Pat. No. 4,757,949, the entire disclosure of which is hereby incorporated by reference into this specification.

By way of further illustration and not limitation, one may use the waste material described in U.S. Pat. Nos. 4,922,841 (hazardous waste material), 4,922,838, 4,919,346, 4,917,310, 4,907,747, 4,906,302, 4,902,167, 4,898,107, 4,897,205 (sludge mixtures), 4,889,060 (municipal solid waste), 4,889,058, 4,886,164 (medical waste), 4,882,903, 4,882,093, 4,877,531 (garbage), 4,874,134, 4,869,882 (soda ash), 4,869,062 (ash), 4,865,642 (metal-containing waste), 4,862,813, 4,859,367, 4,857,458, 4,855,083 (industrial waste), 4,853,116, 4,850,290 (solid hazardous waste), 4,844,875 (fly ash), 4,844,351 (mixed wastes), 4,842,615 (waste coal), 4,834,300, 4,998,675, 4,997,081 (shredded solid waste), 4,993,323 (aluminum smelting waste), 4,989,522 (semiliquid waste), 4,988,487 (industrial waste sludge), 4,988,376 (lead and silica solid waste), 4,986,196, 4,980,029 inorganic waste), 4,977,840, 4,977,837 (fly ash), 4,973,194 (waste sludge), 4,972,998, 4,962,894, 4,953,481, 4,953,457 (solid urban waste material), 4,949,655 (powdered waste) 4,941,415 (municipal waste), 4,936,231, and the like. The entire disclosure of each of these patents is hereby incorporated by reference into this specification.

By way of further illustration, one may also use as waste material(s) tailings from mining operations, sand foundry operations, materials obtained from demolition operations (such as waste brick, waste concrete, waste wood, waste plasterboard, plastic, glass, and the like), waste metal materials, treated wood, etc. Furthermore, when a building material has been made with the process of this invention, it may be recycled and used again in the process.

Referring again to FIG. 1, the waste material(s) is charged via line 10 to grinder 12, it which it is ground until substantially all of its particles have a thickness of less than about 0.5 inches.

As will be apparent to those skilled in the art, the thickness of a material is the dimension between two of an object's surfaces, usually taken to be the dimension of least measure. Thus, for example, although the length of the waste material (such as the length of shredded paper) may be substantially greater than 0.5 inches, as long as one of the dimensions between two of the object's surfaces is less than 0.5 inches it may be used in applicant's process.

It is preferred to grind the waste material until substantially all of the particles of waste have a thickness smaller than about 0.4 inches and, preferably, from about 0.1 to about 0.4 inches.

Any conventional grinder which is suitable for reducing the size of the waste material may be used in the process. Thus, for example, one may use the grinding equipment disclosed on pages 8–16 to 8–43 of Robert H. Perry et al.'s "Chemical Engineers' Handbook," Fifth Edition (McGraw Hill Book Company, New York, N.Y., 1973). Thus, e.g., one may use one or more of the grinders disclosed in U.S. Pat. Nos. 5,048,766, 5,048,764 5,100,069, 5,096,128, 5,064,124, 5,060,872, 5,025,994, 4,9997,485, 4,970,971, 4,925,628, 4,834,300, 4,120,458, and the like. The disclosure of each of these patents is hereby incorporated by reference into this specification.

In one preferred embodiment, illustrated in FIG. 1, the ground material from grinder 12 is passed via line 14 to screening apparatus 16. Oversize material is preferably recycled via line 18 to grinder 12. One may use any conventional screening apparatus such as, e.g., those disclosed on pages 21–39 to 21–44 of said "Chemical Engineers Handbook," supra.

In one preferred embodiment, illustrated in FIG. 1, prior to the time the waste material is charged to grinder 12 it may be sorted into various types of waste material and/or various sizes of waste material in sorter 20. Thereafter, such sorted material may be passed via line 22 to grinder 12. Alternatively, or additionally, the sorted material may be passed via line 24 to screener 16.

The properly sized material from screener 16 may be passed directly to mixer 26 via line 28 if it preferably contains less than a specified amount of moisture or liquid carbonaceous material. The term liquid carbonaceous material, as used in this specification, refers to a liquid petroleum fraction such as, e.g., naphtha, gasoline, kerosene, fuel oil, gas oil, lubricating oil, and the like.

Samples of material from screener 16 may be removed via line 30 to laboratory 32 to determine the extent, if any, of such moisture and/or liquid carbonaceous material in the screened matter.

In general, the screened material should contain less than about 40 weight percent of water and/or liquid carbonaceous material and, preferably, less than about 25 weight percent of water and/or liquid carbonaceous material.

If the screened material contains a sufficiently small (or non-existent) amount of either water or one or more liquid petroleum fractions, then it may be passed directly via line 28 to mixer 26. If, however, it outside of the preferred specifications, then it may be passed via line 34 to oven 36 (where the water level, and/or the petroleum fraction level, may be reduced).

As is known to those skilled in the art, the removal of liquid (such as water and oil) from a material is both time-and temperature dependent. The longer such material is heated, and/or the higher the temperature used in the heating, the more of such liquid will be removed. In general, it is preferred to heat the material at a temperature of at least about 150 degrees Fahrenheit for at least about 20 minutes. In one embodiment, the material is heated at a temperature of at least about 300 degrees Fahrenheit for at least about 20 minutes. The treated material from oven 36 may be passed via line 38 to mixer 26.

In the next step of the process, a silicone epoxy resin is prepared in mixer 26. As is known to those skilled in the art, epoxy resins represent a special type of polyether prepared by a step-polymerization reaction between an epoxide and a dihydroxy compound (usually a bisphenol) in the presence of a base. See, e.g., Malcom P. Stevens' "Polymer Chemistry: An Introduction," Second Edition (Oxford University Press, New York, 1990).

The epoxy resin is formed during a curing step, in which a cross-linked material characterized by the presence of a three-membered cyclic ether group, which is commonly referred to as an "epoxy group," a "1,2-epoxide," or an "oxirane."

The most widely used epoxy resins are diglycidyl ethers of bisphenol A, which are derived from bisphenol and epichlorohydrin. These resins are most commonly cured with anhydrides, aliphatic amines, or polyamides, depending upon the desired properties. See, e.g., pages 431–433 of the Kirk$_{13}$ Othmer "Concise Encyclopedia of Chemical Technology" (John Wiley and Sons, Inc., New York, 1985).

In general, the epoxy resin is prepared by reacting a phenol which is at least dihydric ( such as Bisphenol A, catechol, resorcinol, hydroquinone, hydroquinone, pyrogallol, phloroglucinol, and the like ) with an epoxy compound (the best known of which is epichlorohydrin). The reaction is often conducted in the presence of a curing agent, such as primary amines, secondary amines, adduct amines, liquid Thiokols, aminoplasts, phenoplasts, and the like.

One may use conventional epoxy resins in applicant's process. Thus, by way of illustration and not limitation, one may use the epoxy resins disclosed in U.S. Pat. Nos. 3,519,465, 3,687,879, 4,121,000, 4,252,702, 4,262,043, 4,851,481 (an epoxy resin dispersed with silicone resin particles), 4,865,907, 4,882,201, 4,904,761, 4,908,459, 4,913,930, 4,923,718, 4,942,207, 4,966,729, 4,975,511, 4,981,881, 4,994,515 (a heat-resistant resin), 5,102,722, 5,102,960 (a silicone-epoxy resin composition), 5,089,547 (a polyfunctional epoxy novolac resin), 5,096,762, 5,034,436, 5,039,736, 5,041,474, 5,043,211, 5,082,291, and the like. The disclosure of each of these patents is hereby incorporated by reference into this specification.

In one preferred embodiment, the epoxy resin used in the process possesses enhanced flame-retarding ability One may use any of the known flame-retarded epoxy resins such as, e.g., those disclosed in U.S. Pat. Nos. 3,519,697 flame retarded epoxy resins),, 3,645,971 (flame retardant epoxy resins containing phosphoramidates), 3,707,525, 4,033,926, 4,123,575, 4,145,369, 4,345,059 (phosphine oxide flame retardants), 4,380,571, 4,440,944, 4,554,341, 4,559,395, 4,654,383, 4,849,467, 4,865,907, 4,873,309 (brominated epoxy resin), 4,954,603, 5,084,546, and the like. The disclosure of each of these patents is hereby incorporated by reference into this specification.

In one preferred embodiment, illustrated in FIG. 1, the epoxy resin used in the process is prepared by reacting part A of "epoxy mortar" (obtained as part number RZ 1100 from The Ryzel Corporation of 12185 Kinsman Road, Newbury, Ohio, and identified as being a "resin") with part B of such "epoxy mortar" (which is also obtained as part number RZ 1100, and is identified as being a "hardener"). This preferred embodiment will be illustrated in FIG. 1.

Referring again to FIG. 1, to mixer 26 is charged the part A resin via line 40, and thereafter the part B hardener is charged via line 42. In general, from about 2 to about 8 parts of the part A resin (by weight) are added for each part of the part B hardener. It is preferred to add from about 3 to about 5 parts of resin per part of hardener. It is more preferred to add from about 3.5 to about 4.5 parts of resin per part of hardener. In one embodiment, about 4 parts of resin are added for each part of hardener.

Thereafter, the part A resin and the part B hardener are mixed until a substantially homogeneous mixture is produced. It is preferred to conduct such mixing at a relatively low speed for at least about 1 minute.

After a substantially homogeneous mixture of resin and hardener has been produced, the ground waste materials added via line 28 and/or 38.

In general, from about 10 to about 50 parts (by weight) of ground waste material are charged for each part (by weight) of the epoxy resin reaction mixture. Thus, e.g., one may charge about 4 pounds of paper for each 5 ounces of such reaction mixture. Thus, e.g., one may charge about 8 pounds of municipal refuse, or 10 pounds of glass, or fifteen pounds of metal material, for each 5 ounces of such reaction mixture.

After the ground waste material has been added to mixer 26, it is thoroughly mixed with the epoxy resin until a substantially homogeneous mixture is obtained. Thereafter, to this mixture is added silica, via line 44.

As is known to those skilled in the art, the term silica refers to silicon dioxide. It is preferred that the silica used in this process have a particle size such that substantially all of the particles are from about 0.05 to about 2 millimeters.

In one preferred embodiment, the silica is in the form of silica sand. As is known to those skilled in the art, such sand contains at least about 95 weight percent of silica and usually has a particle size distribution such that at least about 90 weight percent of its particles are smaller than about 10 microns and, preferably, smaller than about 5 microns.

Alternatively, or additionally, one may use Beach sands, Monazite sand, black sands, traction sand, Molding sand, Grant sand, Tuscrawa sand, Zircon sand, Parting sand, Sandblast sand, and the like. These sands are well known to those skilled in the art and are described, e.g., on pages 714-716 of George S. Brady et al.'s "Materials Handbook," Thirteenth Edition (McGraw-Hill, Inc., New York, 1991).

One may add from about 0 to about 1 part of the silica for each part of the reaction mixture; in some instances, such as e.g. when the waste material is shredded rubber or crushed glass, the addition of silica. In general, however, it is preferred to add from about 0.1 to about 1 part of the silica for each part, by weight, of the reaction mixture. Thus, e.g., when waste material in reaction mixture is paper, one may add about 1 part of silica to each part of the reaction mixture. When the waste material in the reaction mixture is municipal refuse material, from about 0.3 to about 0.4 parts of silica may be used for each part of the reaction mixture. When the waste material in the reaction mixture is glass, then from up to about 0.2 parts of silica may be used for each part of the reaction mixture. When the waste material in the reaction mixture is metal, then up to about 0.1 parts of silica may be used.

In addition to the sand, one may also charge a colorant to mixer 26 via line 46. Additionally, or alternatively, one may charge colored sand (via line 44) and/or colored epoxy resin.

The material in the mixer 26 is then again mixed until it is substantially homogeneous. Thereafter, it is passed via line 48 to former 50, wherein it may be formed into desired shape and size.

Former 50 may be any conventional forming means. Thus, former 50 may be a press, a mold, a die, and the like. In one preferred embodiment, former 50 is a mold.

One may form a combination of both the cement-like material of this invention and another material, such as an insulating material. Thus, e.g., one may charge the cement-like material to a mold, then dispose an insulating insert above the cementitious material, and then cover the insert with a top layer of the cementitious material.

Figure 2:
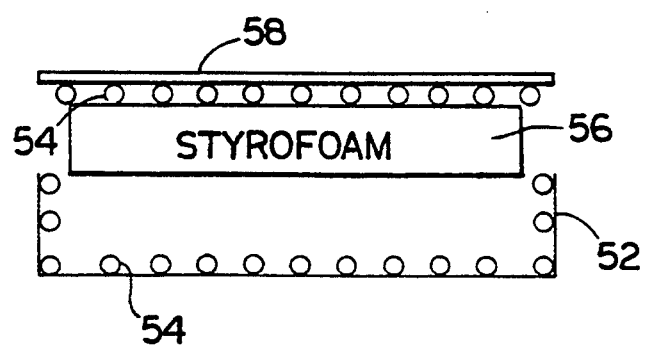
FIG. 2 is an exploded perspective view illustrating the preparation of a building material comprised of a polystyrene core.

FIG. 2 is a schematic illustration of one means of forming a desired product. Referring to FIG. 2, it will be seen that, to mold 52 may be charged the cement-like material 54 produced in mixer 26; a layer of such material may be applied to the bottom and the sides of the mold. Thereafter, an insulating material, such as styrofoam insert 56, may be inserted within the mold until it is contiguous with the bottom layer of the cement-like material 54. Thereafter, additional cement like material 54 may be added to cover the insert 56, and the entire assembly may be compressed by surface 58.

PROPERTIES OF THE INSULATING MATERIAL OF THIS INVENTION

The building material produced by the process of this invention has excellent physical and chemical properties.

The building material is resistant to acid. Thus, one sample of such material was soaked in a 20 percent solution of nitric acid for 5 days. The acid failed to permeate such material, and the physical properties of the material were not adversely affected.

The building material is impermeable to water.

Salt does not react with or affect the building material of this invention.

In one preferred embodiment, the building material of this invention often has a compressive strength in excess of 5,000 pounds per square inch, and a modulus of elasticity of less than about 500,000 pounds per square inch.

The following examples are presented to illustrate the claimed invention but is not to be deemed limitative thereof. Unless otherwise specified, all parts are by weight, and all temperatures are in degrees Fahrenheit.

EXAMPLE 1

A mixture of waste material was prepared which contained 1 pound of shredded paper, 1 pound of red clay brick, 1 pound of concrete, 1 pound of aluminum, 1 pound of glass, 1 pound of wood chips, 1 pound of sawdust, 0.5 pound of orange peels, and 0.5 pound of plastic milk cartons. The components of the mixture were comminuted so that substantially all of the particles in the mixture had a thickness which was smaller than 0.25 inches.

The mixture was placed in an electric oven and heated at 300 degrees Fahrenheit for 15 minutes. The heated mixture was then allowed to cool.

Four ounces of "resin" (obtained as part number RZ 1100 from the Ryzel Corporation of 12185 Kinsman Road, Newbury) Ohio) were mixed with 1 ounce of "hardener" (also obtained as such part number RZ 1100) for 60 seconds. Thereafter, this resin/hardener mixture was added to the mixture of waste material and thoroughly mixed therewith for 3 minutes. Thereafter, 3 pounds of silica sand (also obtained as such part number RZ 1100) were added to the mixture and then thoroughly mixed for 2 minutes.

The mixture was then charged into a mold with a substantially rectangular shape and internal dimensions of 3.5 inches width×6.0 inches length×2.5 inches depth. Thereafter, the mixture was uniaxially compacted within the mold and pressed for about 2 hours.

Thereafter, the body, which had hardened, was removed from the mold and subjected to various physical tests. It was found to have compressive strength of 5,240 pounds per square inch and a modulus of elasticity of 360,000 pounds per square inch.

A sample of the body was immersed in a 20 percent solution of nitric acid for 5 days. The acid failed to permeate the sample, and the sample's physical properties did not appear to be adversely affected.

EXAMPLE 2

The procedure of Example 1 was substantially followed, with the exception the waste material used was 10 pounds of glass which was ground so that all of its particles had a thickness which was smaller than 0.25 inches; the waste material was not heated prior to the time it was mixed with the epoxy resin. In this example, furthermore, 2 pounds of black silica sand were added to the waste material/epoxy resin mixture.

The reaction was charged into a rectangular mold with interior dimensions of 2 feet×3 feet×0.5 inches depth. A strong sheet of building material was produced.

EXAMPLE 3

The procedure of the experiment of Example 2 was substantially followed, with the exception that six pounds of shredded tire material was used instead of the glass; the tire material had particle size distribution such that substantially all of its particles had a thickness which was smaller than 0.5 inches. 3.0 pounds of the silica sand of the experiment of Example 1 was also used in this experiment.

The reaction mixture was charged into a mold with interior dimensions of 3.0"×6.0"×2.0". The elastomeric product produced in this experiment apparently had physical properties which were comparable to the building product of the experiment of Example 1.

EXAMPLE 4

The procedure of the experiment of Example 3 was substantially followed, with the exception that 4.0 pounds of wood chips with an average thickness of less than 0.25 inches were used. Additionally, 4.0 pounds of sawdust were also used in the experiment of this Example. The waste material was not heated prior to being mixed with the epoxy resin. 3.0 pounds of silica sand were used.

The reaction mixture was charged into a mold with interior dimensions of 3.0" by 6.0" by 2.0".

EXAMPLE 5

The procedure of Example 1 was substantially repeated, with the exception that 6.0 pounds of commercial grade plastic material all of whose particles had a thickness which was smaller than 0.375 inches were used; no heating of the material was conducted prior to mixing with the epoxy resin. 3.0 pounds of silica sand were used.

The reaction mixture was charged into a mold with internal dimensions of 3"×6" by 2".

EXAMPLE 6

The procedure of Example 1 was substantially repeated, with the exception that 10 pounds of shredded paper were used.

In this experiment, 4 ounces of the resin were mixed with 1 ounces of the hardener; and this mixture was then mixed with the shredded paper. The mixture was then poured into a form with interior dimensions of 6"×16"×6" and allowed to harden.

Thereafter, the hardened mixture resin was ground so that its particles were smaller than 0.25 inches, and the ground particles were then mixed with a mixture of 2 ounces of the resin of Example 1 and 1 ounce of the hardener of Example 1. Five pounds of silica sand were then added to and mixed with this mixture. The mixture was then charged into two molds, each of which were 3"×6" by 2".

The blocks produced in the experiment of this example had physical properties comparable to the properties of the block of example 1.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

I claim:

1. A process for preparing a building material, comprising the steps of:
    (a) providing a ground waste material, wherein:
        1. substantially all of the particles of said waste material have a thickness which is smaller than about 0.5 inches; and
        2. said waste material contains less than about 40 waste percent of liquid selected from the group consisting of water, liquid carbonaceous material, and mixtures thereof;
    (b) providing an epoxy resin;
    (c) mixing from about 10 to about 50 parts, by weight, of said ground waste material with each part of said epoxy resin, thereby providing a first mixture of said ground waste material and said epoxy resin; and
    (d) thereafter mixing silica with said first mixture in a weight/weight ratio of from about 0.1 to about 1 part of silica to 1 part of said first mixture of said ground waste material and said epoxy resin, thereby producing a second mixture of silica, waste material, and epoxy resin.

2. The process as recited in claim 1, wherein said substantially all of the particles of said ground waste material are smaller than about 0.4 inches.

3. The process as recited in claim 2, wherein said waste material contains less than about 25 weight percent of said liquid.

4. The process as recited in claim 3, wherein said epoxy resin is a diglycidyl ether of bisphenol A.

5. The process as recited in claim 4, wherein said epoxy resin is flame-retarded.

6. The process as recited in claim 4, wherein said epoxy resin is comprised of a colorant.

7. The process as recited in claim 4, wherein said silica is in the form of sand.

8. The process as recited in claim 7, wherein said sand is comprised of at least about 95 weight percent of silicon dioxide.

9. The process as recited in claim 8, wherein at least about 90 weight percent of the particles of said sand are smaller than about 10 microns.

10. The process as recited in claim 9, wherein at least about 90 weight percent of the particles of said sand are smaller than about 5 microns.

11. The process as recited in claim 10 wherein said mixture of silica, ground waste material, and epoxy resin are charged to a receptacle comprised of a bottom surface.

12. The process as recited in claim 11, wherein said bottom surface of said receptacle is coated with a layer of said mixture of silica, ground waste material, and epoxy resin.

13. The process as recited in claim 12 wherein polystyrene is disposed within said receptacle on top of said layer of said mixture of silica, ground waste material, and epoxy resin.

14. The process as recited in claim 13, wherein said mixture of silica, ground waste material, and epoxy resin is charged into said receptacle on top of said polystyrene.

15. The process as recited in claim 4, wherein said waste material is comprised of shredded paper.

16. The process as recited in claim 4, wherein said waste material is comprised of an elastomeric material.

17. The process as recited in claim 16, wherein said waste material is shredded tire chips.

18. The process as recited in claim 4, wherein said waste material is comprised of glass.

19. The process as recited in claim 4, wherein said waste material is comprised of aluminum.

20. The process as recited in claim 4, wherein said waste material is comprised of concrete.

* * * * *